May 31, 1966   B. H. CLAMPITT ETAL   3,253,955
ELECTROCHEMICAL CELL FOR CONVERSION OF HEAT ENERGY
Filed Sept. 5, 1961   4 Sheets-Sheet 1

INVENTORS,
BERT H. CLAMPITT
BY DALE E. GERMAN

*John H. Widdowson*
ATTORNEY

May 31, 1966     B. H. CLAMPITT ETAL     3,253,955

ELECTROCHEMICAL CELL FOR CONVERSION OF HEAT ENERGY

Filed Sept. 5, 1961     4 Sheets-Sheet 4

INVENTORS.
BERT H. CLAMPITT
BY DALE E. GERMAN

*John H. Widdowson*
ATTORNEY

United States Patent Office  3,253,955
Patented May 31, 1966

3,253,955
ELECTROCHEMICAL CELL FOR CONVERSION OF HEAT ENERGY
Bert H. Clampitt, Overland Park, and Dale E. German, Wichita, Kans., assignors to The Boeing Company, Wichita, Kans.
Filed Sept. 5, 1961, Ser. No. 135,827
11 Claims. (Cl. 136—83)

This application is a continuation-in-part of application Serial No. 61,452, filed October 10, 1960, entitled Solar to Electrical Energy Conversion System, and issued as Patent No. 3,031,520.

This invention relates to conversion of energy. In a more specific aspect this invention relates to method and means of obtaining electrical energy from heat energy. In a more specific aspect, the invention relates to method and means of obtaining electrical energy from heat energy by electrochemical cell means operating on temperature differential.

Various types of method and means for obtaining electrical energy are known. These include the common galvanic cell or storage battery utilizing metallic plates and a suitable acid as the electrolyte. Also, so-called dry cells or non-reversible cells are known and such utilize chemical energy within the cell and are disposed of when the chemical energy is entirely used up. Some electrochemical cells are also known, such as the common storage battery used in internal combustion engine vehicles. Electrochemical cells are desirable in many installations or locations and the use of such cells in space vehicles and in relatively nonaccessible areas is particularly important. This is especially true with the cell of the invention, since same can be operated from energy sources normally available in even remote, non-accessible installations, including space ships, polar areas, etc.

In accordance with the present invention method and means for obtaining electrical energy from heat energy are provided. The cell of the invention includes masses of an ionizable chemical compound having electrodes therewith. The masses are in ion exchange relation to remove an ion from one of the masses and to provide an ion to the other of the masses when a change in temperature occurs in at least one of the masses of the compound.

In preferred specific embodiments of the invention, ionized masses of a compound are in solution and an ion from one of the masses passes through an ion bridge to the other of the masses. In other preferred specific embodiments of the invention, the masses of the compound are separated and an electrical conductor joins same so that when an ion is removed from one of the masses of the compound a like ion is provided to the other of the masses of the compound. In still further preferred specific embodiments of the invention, a so-called dry cell is provided wherein the masses of the compound are desirably a paste-like consistency. A temperature differential between portions of the cell employed containing the ionized masses of the chemical compound is obtained by the addition of heat to one portion of the cell or removal of heat from one portion of the cell by convection, conduction, radiation or combinations thereof. Where the compounds are in solution, saturated solutions are preferably used and an excess of the compound in the solid form is provided in the portion of the cell which undergoes a change in temperature and solubility to maintain a saturated solution therein.

The method of the invention includes the steps of providing electrodes in two masses of a chemical compound and providing a temperature differential between the masses to obtain a difference in solubility of the masses of the compound. The temperature differential can be obtained by adding or removing heat from one of the masses of the compound by convection conduction, radiation or combinations thereof. The method of the invention can be used to obtain either reversible cells or non-reversible cells.

Accordingly, it is an object of the invention to provide new method and means of obtaining electrical energy.

Another object of the invention is to provide new method and means for obtaining electrical energy from heat energy.

Another object of the invention is to provide a new method and means for obtaining electrical energy from heat energy and to obtain a reversible system.

A further object of the invention is to provide new method and means of obtaining electrical energy from heat energy in a non-reversible cell.

A still further object of the invention is to provide a new method and means of obtaining electrical energy from heat energy supplied by convection, conduction and/or radiation.

A further object of the invention is to provide new method and means of obtaining electrical energy from heat energy whereby transfer of an ion from one portion of the cell to another portion of the cell occurs when differences in solubility exist in the portions of the cell.

Another object of the invention is to provide new method and means of obtaining electrical energy as a result of temperature and solubility differences.

A further object of the invention is to provide a new method and means of obtaining electrical energy from heat energy whereby the electrical energy is obtained without transference of an ion from one portion of the cell to the other.

Various other objects, advantages and features of the invention will become apparent to those skilled in the art from the following description taken in connection with the accompanying drawings, in which:

The following is a discussion and description of preferred specific embodiments of the new method and means of obtaining electrical energy of the invention, such being made with reference to the drawings whereon the same reference numerals are used to indicate the same or similar parts and/or structure. It is to be understood that such discussion and description is not to unduly limit the scope of the invention.

Figure 1:
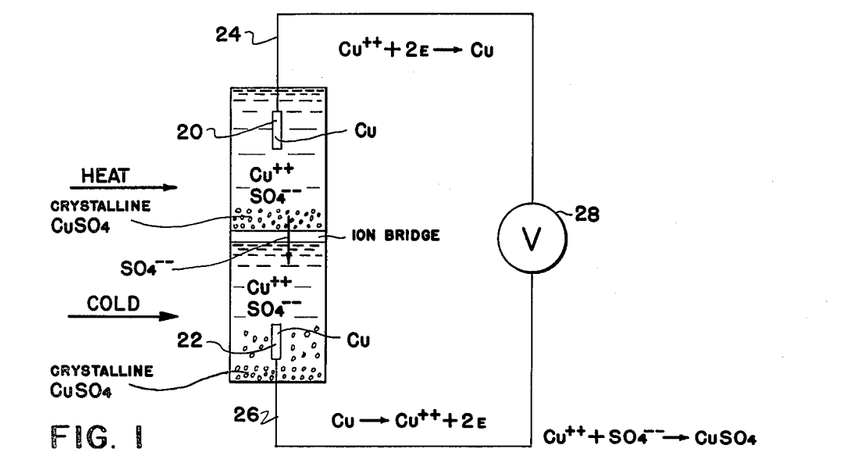
FIG. 1 is a diagrammatic view illustrating a preferred specific embodiment of the new method and means for obtaining electrical energy from heat energy of the invention.

Referring now to the drawings in detail, FIG. 1 diagrammatically illustrates construction and operation of a preferred specific embodiment of the method and means of obtaining electrical energy from heat energy of the invention. In FIG. 1 a container is shown which is divided into chambers or compartments and an ion bridge is positioned between the two chambers or portions of the container. Both of the portions of the container are provided with electrodes as shown at 20 and 22, the electrodes preferably being reversible, that is, the electrodes being constructed of one of the materials in solution. Electrodes 20 and 22 are constructed of copper in the specific example illustrated in FIG. 1. The electrodes 20 and 22 are connected to electrical conductors 24 and 26, respectively, which are joined to means to receive or measure the electrical energy of the cell, such as a voltmeter shown at 28. Each portion of the container receives an ionizable chemical compound in a suitable solvent, such as cupric sulphate in water. Preferably, both of the portions of the cell contain saturated solutions of cupric sulphate and one portion, such as the upper portion, is initially provided with an excess amount of crystalline cupric sulphate as illustrated.

A temperature differential is obtained between the two portions of the cell, such as by providing heat to the upper portion as diagrammatically illustrated and insulating the lower portion of the cell. The temperature differential can also be obtained by cooling one portion of the cell, or by heating one portion and cooling the other portion of the cell. A change in solubility results in at least one portion of the cell due to the change in temperature and additional amounts of the crystalline cupric sulphate go into solution or are removed from solution. Due to the different amounts of cupric sulphate in solution in the two portions of the cell and the temperature differential or thermo-couple effect an electrical potential is obtained.

When electrical energy is drawn from the cell the net result at the electrodes will be the depositing of a portion of the copper in the heated solution on the electrode 20, that is the copper ion receives two electrons and is deposited as copper metal on the electrode 20. In the other portion of the cell, copper from the electrode 22 goes into solution, that is the solid copper gives up two electrons and a copper ion goes into solution. Also, a sulphate ion from the heated portion of the cell passes through the ion bridge and combines with a copper ion in the lower portion or insulated portion of the cell and since this portion of the cell already contains a saturated solution of cupric sulphate, the excessive amount of cupric sulphate will be deposited as crystalline cupric sulphate. As electrical energy is drawn from the cell, the crystalline cupric sulphate in the heated portion of the cell passes into solution and an equal amount of crystalline cupric sulphate will be deposited in the other portion of the cell. Since the electrodes are reversible, the cell can then be used again merely by supplying heat to the previously insulated portion of the cell and likewise insulating the previously heated portion of the cell from heat, which will again cause a temperature differential to exist.

Figure 2:
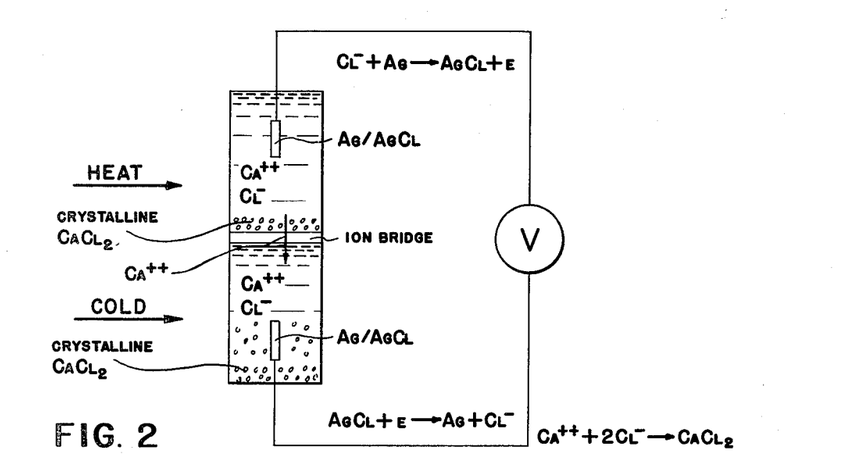
FIG. 2 is a diagrammatic view illustrating another preferred specific embodiment of the invention.

FIG. 1 of the drawings illustrates a cell wherein the electrodes are reversible to the cation of the compound in solution. Cells can also be constructed wherein the electrodes are reversible to the anion of the compound in solution, and such a cell is illustrated in FIG. 2 of the drawings. In this embodiment the electrodes are made of silver-silver chloride and the compound in solution is calcium chloride. The operation of this type of cell is similar to that shown in FIG. 1 except the anion of the electrolyte, in this case chlorine, is deposited on the silver-silver chloride electrode in the heated portion of the cell and the cation, in this case calcium, passes through the ion bridge and combines with a chloride ion from the electrode in the insulated portion of the cell to form additional amounts of calcium chloride, which are deposited in the solid or crystalline form in the insulated portion of the cell. The result in the various portions of the cell is indicated diagrammatically in FIG. 2. In the heated portion of the cell an ion of chlorine combines with silver in the electrode to form silver chloride, and a chlorine ion from the electrode in the insulated portion of the cell combines with a calcium ion from the other portion of the cell to form crystalline calcium chloride. Here, as in the embodiment of FIG. 1, the temperature differential can be obtained by heating one portion of the cell, cooling one portion of the cell, or by heating one portion of the cell and cooling the other portion.

Figures 3, 4, 5, 6:
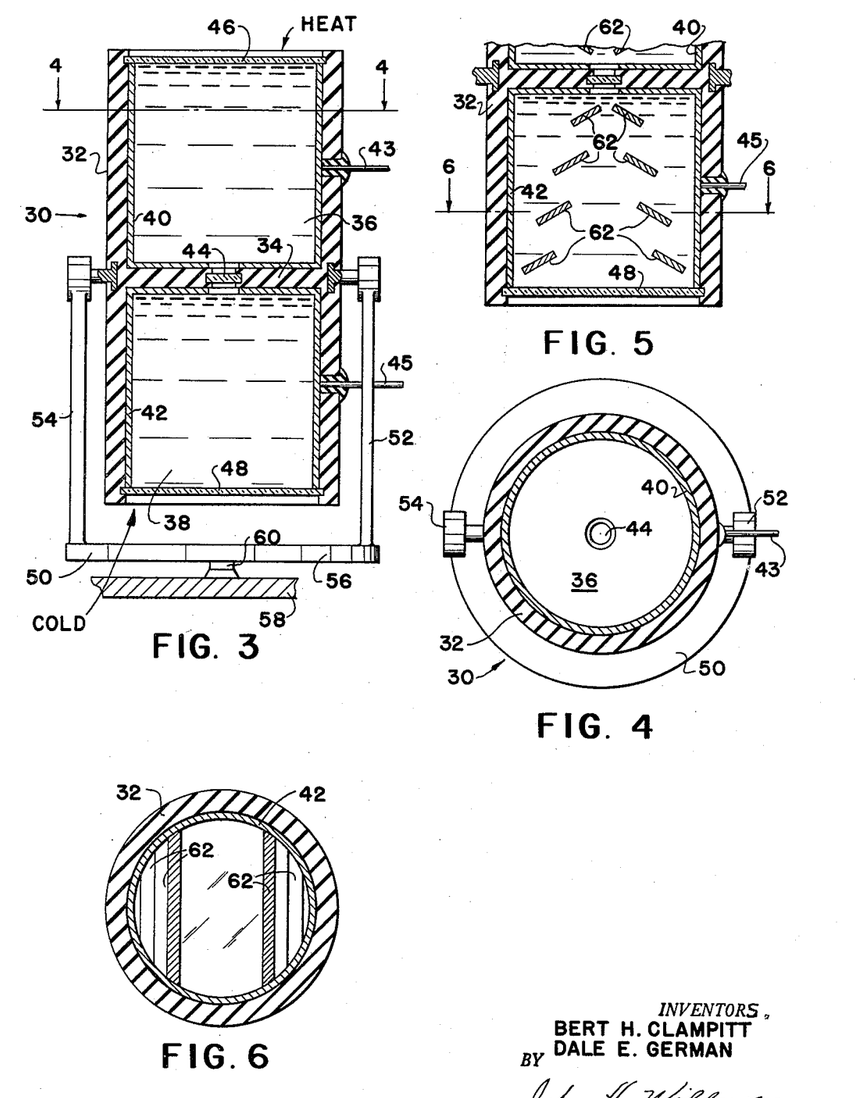
FIG. 3 is a longitudinal cross section showing a preferred specific embodiment of the electrochemical cell of the invention.
FIG. 4 is a cross section view taken along the line 4—4 of FIG. 3.
FIG. 5 is a partial longitudinal cross section view showing a modification of a preferred specific embodiment of the electrochemical cell of the invention.
FIG. 6 is a cross section view taken along the line 6—6 of FIG. 5.

A preferred specific embodiment of an electrochemical cell constructed in the manner diagrammatically illustrated in FIGS. 1 and 2 is shown in the drawings in FIGS. 3 and 4. In this specific embodiment, the cell is shown generally at 30 and includes an elongated housing 32 which is preferably a tubular member and constructed of an insulating material, such as rubber, rubberlike materials, suitable plastics, etc. The tubular member 32 is preferably provided with means to divide same into separate containers or chambers, such as the integral wall 34. Preferably the wall 34 is located so as to provide two containers or chambers 36 and 38 which are of like size and which open to opposite ends of tubular member 32. Electrodes are provided in the chambers 36 and 38 and such can be provided by forming a copper liner or wall 40 and 42 on the inner surface of the tubular member 32 and the wall 34. If desired, the electrodes 40 and 42 can be separately constructed cup-shaped members and inserted in the tubular member 32 after construction of same. Electrical conductors 43 and 45 pass through the outer wall of member 32 and are connected to electrodes 40 and 42, respectively.

An aperture or opening is provided through the wall 34 and through the electrodes in the chambers or containers 36 and 38. An ion bridge 44 of any suitable construction is mounted in the aperture or openings in the wall 34. The ion bridge can be a sintered glass ion bridge, a porous disc, a salt bridge, an agar-agar salt bridge, an ion permeable membrane, pure diffusion (no separation), or other suitable types of bridges known to the art. The bridge illustrated is a sintered glass ion bridge.

The ends of the tubular member 32 are closed by suitable cover members as shown at 46 and 48. The cover members 46 and 48 can be constructed of any suitable material and in the embodiments illustrated in FIGS. 3 and 4 such is preferably made of transparent or translucent material so that radiant heat energy can pass therethrough. As will be apparent to those skilled in the art, other types of heat energy can also be used with the device shown in FIGS. 3 and 4.

Suitable means are desirably provided to alternately direct first one end of the tubular member 32 and then the other end toward a source of radiant heat, such as the sun, particularly in outer space where the radiant heat therefrom is at a maximum, etc. Such is shown in FIG. 3 as being an azimuth mount 50 including spaced side arms 52 and 54 secured to a base portion 56 which is adjustably mounted on a support 58 by any suitable means, such as a pivot 60. Arms 52 and 54 pivotally mount member 32. The base portion 56 can be rotated about the pivot 60 and the tubular member 32 can be adjusted about the side arm portions 52 and 54. The heat energy from the radiating source passes through the cover member directed toward the source, and the insulation provided by the tubular member 32 and wall 34 prevents heat from being received by the other chamber. Thus, the chambers 36 and 38, when filled with saturated solutions of chemical compounds as previously indicated undergo the reactions described to result in an electrical potential between the chambers or portions of the cell. The cell illustrated can be considered a storage cell since the insulated walls of member 32 will tend to retain the temperature differential and thus the electrical potential.

In many instances, the chemical compounds which can be used with the electrochemical cell of the invention, for example blue cupric sulphate, will readily receive radiant heat energy to cause the desired chemical reactions because of its high radiant heat absorption. In other instances, such as where the solution is clear or transparent, it is desirable to provide suitable means therein to insure maximum absorption and use of radiant heat energy. In some instances artificial coloring can be added to the solution to improve absorption of radiant energy. In other instances, suitable structure can be added to receive the heat and retain same within the solution to heat the solution. Such an embodiment is illustrated in FIGS. 5 and 6 of the drawings wherein baffles are formed by metallic members 62 which are secured in their end portions to the tubular member 32 or to the walls or liners 40 and 42 therein. The baffles 62 are preferably constructed of dark colored metal or other suitable materials which readily absorb heat from a radiant source. Baffle members 62 will receive the heat and will in turn heat the surrounding solution. The baffle members 62 are preferably mounted in staggered relation as illustrated in FIGS. 5 and 6 so that radiant heat entering the end or cover 48 or 46 is received by the greatest number of the baffles, thus making most efficient use of the heat available. While such means for receiving the heat energy are normally used in clear solutions, it will be understood by those skilled in the art that such baffle members can be utilized with any of the various types of compounds usable in order to increase efficient utilization of the heat energy by the cell.

Figure 12:
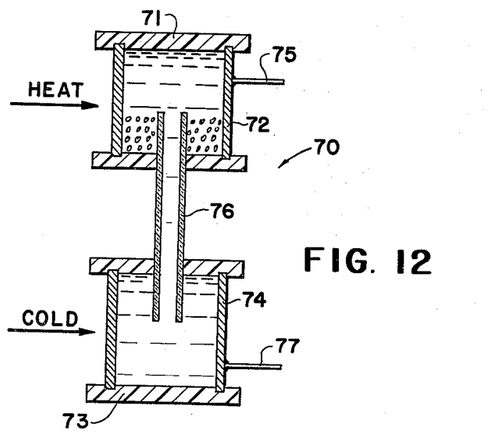
FIG. 12 is a cross section view diagrammatically illustrating another construction of a cell in accordance with the invention.

Another preferred specific embodiment of the invention is illustrated in FIG. 12 of the drawings. In this embodiment the cell is shown generally at 70 and includes two containers or chambers formed by walls 72 and 74 and cover members 71 and 73. The containers can be physically separated as shown in FIG. 12. The walls of the containers are made of suitable materials to function as the electrode and conductors 75 and 77 are attached thereto. The chambers or containers defined by walls 72 and 74 are joined by an elongated tube 76 of glass, plastic, etc. and such serves as the ion bridge, pure diffusion being obtained by use of a tube 76. Tube 76 extends into both of the containers or chambers 72 and 74 and the upper one of these initially receives the crystalline compound up to the level of the top of the tube 76. The cell 70 illustrated in FIG. 12 has an advantage over previously described cells in that the chambers or containers 72 and 74 are physically separated and therefore the heat applied to one chamber or container is not received by the other chamber. Since physical separation of the chambers is possible the outside surface of the individual cells or chambers need not be insulated in many instances. Also, the containers 72 and 74 in such cells can be made of copper, silver, etc. to serve as the electrodes and such also can receive heat by conduction or convection. Also, the chambers or containers can be formed of other materials, such as glass or the like with additional electrodes being provided separately therefrom so that heat can be obtained by radiation and conduction. The cell in FIG. 12 can also utilize radiant heat energy by making the covers 71 and 73 of a material to pass such heat, including plastics, glass and the like.

A number of experimental cells have been constructed in the manner illustrated in FIG. 1 and operated, and the test results on these cells are set forth hereinbelow. In each instance, the cold junction was at 20 degrees C. and the electrodes were reversible to the cation of the compound in solution. The measurements indicated were made on a single cell and open circuit voltages were measured. These specific examples are given by way of illustration and are not intended to unduly limit the scope of the invention.

*Table I*

| Solvent | Solute | Hot Junction (Degrees C.) | E.M.F. (Millivolts) | Seebeck Coef. |
| --- | --- | --- | --- | --- |
| Water | $CuSO_4$ | 100 | 71.0 | 0.89 |
| Water | $CuSO_4 + Na_2SO_4$ | 100 | 81.5 | 1.01 |
| Water + 20 percent $H_2SO_4$ | $CuSO_4 + Na_2SO_4$ | 100 | 82.5 | 1.03 |
| Water | $Zn(C_2H_3O_2)_2$ | 100 | 88.8 | 1.11 |
| Water | $Pb(C_2H_3O_2)_2$ | 100 | 16.0 | 0.20 |
| Methyl Alcohol | $CuSO_4$ | 64 | 30.0 | 0.68 |
| Dimethyl Sulfoxide | $CuSO_4$ | 152 | 157.3 | 1.19 |
| Dimethyl Formamide | $CuSO_4$ | 148 | 125.0 | 0.98 |
| Acetone | $CuSO_4$ | 55 | 25.0 | 0.71 |

In several instances the power output and voltage at maximum power were measured and these results are shown below.

*Table II*

| Solvent | Solute | Voltage at Maximum Power (Millivolts) | Maximum Power (Microwatts/cm.$^2$) |
| --- | --- | --- | --- |
| Water | $CuSO_4$ | 30.9 | 30.5 |
| Water and 20 percent $H_2SO_4$ | $CuSO_4$ | 28.0 | 251.0 |
| Water | $Zn(C_2H_3O_2)_2$ | 43.2 | 8.64 |

These results compare very favorably with other means of obtaining electrical energy from heat energy, such as metal to metal thermocouples of various types and constructions.

Various types of polar solvents can be used with the invention including the following which are set forth by way of example and are not to unduly limit the scope of the invention: water, methyl alcohol, ethyl alcohol, other suitable alcohols, dimethyl formamide, dimethyl sulfoxide, acetone, methyl ethyl ketone, sulfuric acid, acetic acid, other suitable organic acids, butyl phosphate, ammonia, hydrazine, and the like, and mixtures thereof.

The solute can be any suitable ionizable chemical compound, including cupric sulphate, zinc acetate, lead acetate, zinc fluoride, nickel chloride, ferrous sulphate, beryllium sulphate, calcium chloride, and the like, and mixtures thereof. The specific solutes set forth herein are intended to be illustrative of suitable materials and are not intended to be an exhaustive enumeration of all materials usable with the invention, nor is such to unduly limit the scope of the invention.

Combinations of solvents and/or combinations of solutes have been used and desirable results obtained. For example, a solvent composed of water and 20% sulphuric acid has been used with a solute of cupric sulphate and sodium sulphate with very good results being obtained. See Table I. Combinations of solvents and/or solutes are selected to increase the number of like ions in solution and this increases the amperes obtained from a particular cell. The use of the combination solutes containing like ions in solution rapidly increases the number of like ions in solution upon being subjected to heat energy.

Figure 7:
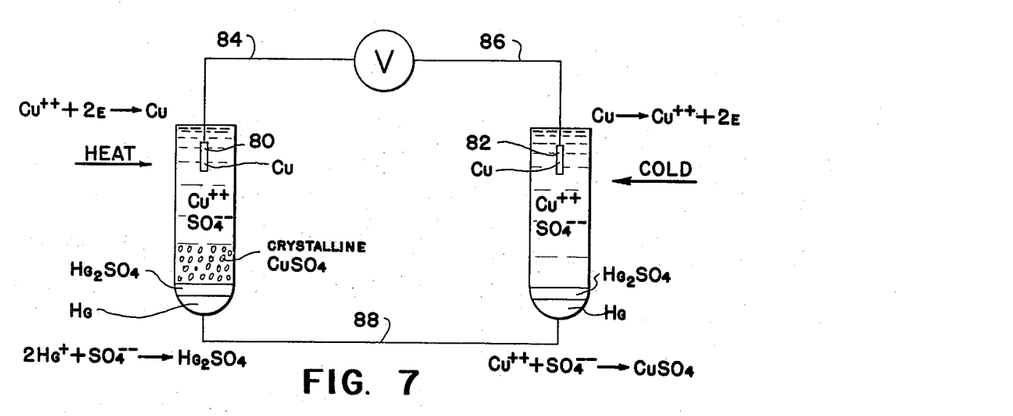
FIG. 7 is a diagrammatic view illustrating other preferred specific embodiments of the method and means for obtaining electrical energy from heat energy of the invention.

A still further embodiment of the invention is diagrammatically illustrated in FIG. 7 of the drawings. FIG. 7 shows a cell which is constructed so that the portions of the cell are in ion exchange relation as in previous embodiments although here there is no actual transfer of an ion from one chamber or portion of the cell to the other portion of the cells. The two chambers or portions of the cell are physically separated and each chamber or portion of the cell contains a saturated solution of an ionized chemical compound, such as cupric sulphate as illustrated. Two electrodes 80 and 82 are provided and such are reversible to one of the ions in solution. In this instance, copper electrodes are provided and are reversible to the copper ion. The electrodes 80 and 82 are connected by electrical conductors 84 and 86, respectively, which are connected in their other end portions to a voltmeter or other suitable means to receive or measure potential of electricity from the cell. Each of the chambers or portions of the cell are also provided with another electrode which is reversible to the other ion of the chemical compound in the solution. In the cell illustrated in FIG. 7 this is provided by a layer of mercury and mercurous sulphate in the bottom of each of the chambers or portions of the cell and such are connected by an electrical conductor 88. Initially one portion of the cell contains an excess of the chemical compound in the solid form.

Two chambers or portions of the cell are connected as illustrated in FIG. 7 and a temperature differential is provided between the portions of the cell by heating one side of the cell, cooling one side, or heating one side and cooling the other side. For example, one portion or side of the cell is heated, such as the left portion in FIG. 7, and a portion of the crystalline copper sulphate in the heated portion of the cell passes into solution as a result of the heating of the solution. This results in a greater amount of cupric sulphate in solution in the heated portion of the cell than is in the nonheated portion of the cell and an electrical potential is obtained as a result of the temperature and solubility differences. At the electrodes, a copper ion in the heated portion of the cell receives two electrons and is deposited as solid copper on the electrode 80. In the other portion of the cell the electrode 82 gives up two electrons and a copper ion passes into solution.

Then there exists in the non-heated or right-hand portion of the cell an excess of copper ions in solution, and some of the copper ions combine with sulphate ions from the layer of mercurous sulphate and since the solution in the insulated portion is already saturated the cupric sulphate resulting therefrom is deposited in the insulated portion of the cell as solid or crystalline cupric sulphate. There is a resulting increase in the amount of mercury and a decrease in the amount of mercurous sulphate in the right-hand portion or insulated portion of the cell.

In the left-hand or heated portion of the cell the solution contains an excessive amount of sulphate ions after the copper ion has been deposited on the electrode 80. Some of the sulphate ions combine with ions from the mercury layer and results in an increase in the amount of mercurous sulphate present in the heated portion of the cell. Thus, while the compounds in the portions of the cell are physically separated they are still in ion exchange relation and the net result in the solutions is the transfer of an ion from one portion of the cell to the other portion of the cell.

The cell shown and described in connection with FIG. 7 is also a reversible cell and when all of the crystalline cupric sulphate in the heated portion of the cell has gone into solution, then the other portion of the cell can be heated to reverse the process. As an alternative, the previously heated portion of the cell can be cooled by any suitable means and the same net result obtained.

Figure 9:
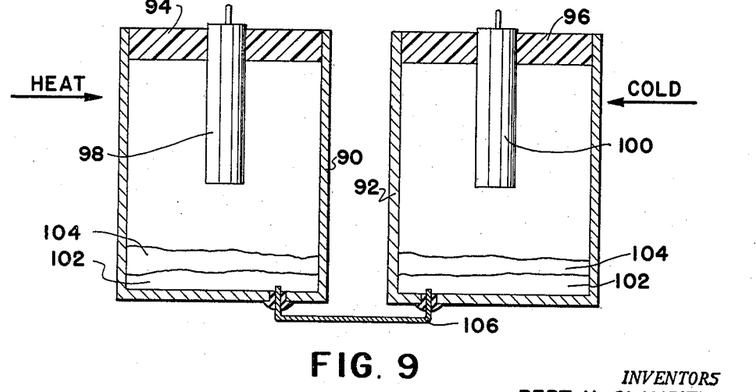
FIG. 9 is a cross section view illustrating a preferred construction of a cell without transference.

FIG. 9 of the drawings illustrates a preferred manner of constructing an electrochemical cell of the type diagrammatically illustrated in FIG. 7. Two separated containers 90 and 92 are provided with covers 94 and 96, respectively, and the covers can be constructed of a clear plastic, glass, etc. to insulate the electrodes from the containers and to admit radiant heat. Electrodes 98 and 100 are provided and are mounted in the covers 94 and 96 to the containers 90 and 92, respectively. The electrodes 98 and 100 are reversible to one of the ions in solution. For example, when cupric sulphate is used as the electrolyte then the electrodes 98 and 100 can be constructed of copper.

A second electrode is provided in each of the containers 90 and 92 by placing therein a layer of mercury and mercurous sulphate as indicated at 102 and 104, respectively, in each of the containers. An electrical conductor 106 is provided and is connected in its ends to the layers of mercury 102 in the containers. The containers 90 and 92 are then filled with saturated solutions of the ionizable chemical compound being used, such as cupric sulphate, and one of the containers is provided with an additional amount of the chemical compound in the solid form. When a temperature differential is obtained between the portions of the cell an electrical potential is obtained between the electrodes 98 and 100 as a result of the temperature and solubility differentials.

The cell illustrated in FIGS. 7 and 9 is very versatile and has a number of advantages. The cell can be constructed of a transparent material as described hereinbefore so that radiant heat can be used as the energy source. Also, the walls of the container forming the portions of the cell can be constructed of a heat conducting metal and such makes the cell desirably usable when the heat energy is transferred by conduction or convection. The cells without transference are particularly desirable where the heat is obtained by convection and conduction since the two portions of the cell can be physically separated and problems of insulating one cell from the heat are substantially eliminated. Furthermore, this type of cell can readily utilize differences in temperature normally present, such as in the arctic regions, between the basement and roof top of a building, the interior and exterior of a building, ship, space vehicle or the like, etc. Where these normal temperature differentials are present the energy available from the cell is easily stored until used.

Figure 8:
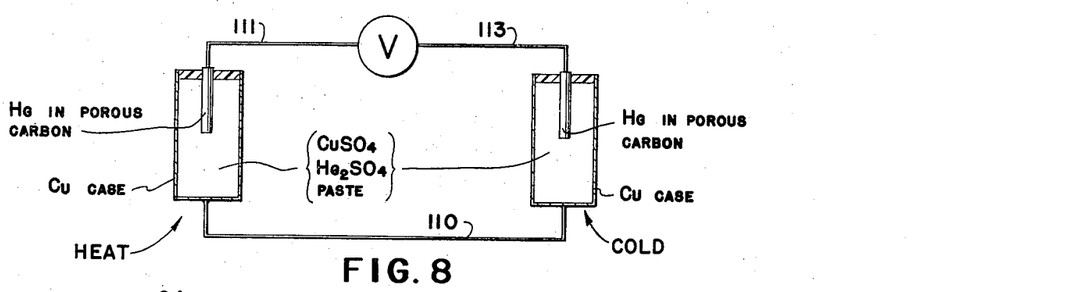
FIG. 8 is a view illustrating the method and means of constructing a so-called dry cell in accordance with the invention.

FIG. 8 of the drawings illustrates a still further embodiment of the invention and is directed to a so-called "dry cell." The cell of FIG. 8 is also a cell without actual transference of an ion between portions of the cell although the portions of the cell are in ion exchange relation. In the preferred embodiment illustrated two physically separated containers or chambers are provided and are connected by an electrical conductor 110. The case or containers can be formed of the solid material of one of the ions in solution, such as copper as illustrated and the conductor 110 is then secured directly to the case. A second electrode is provided for each of the containers or chambers and such is illustrated as being mercury in porous carbon. The mercury electrode is insulated from the copper case by the plastic cover when the case is constructed to provide the other electrode. Electrical conductors 111 and 113 are connected to the mercury electrodes. In the dry cell embodiment, the two chambers or containers are filled with a paste material containing the electrolyte or ionizable compound which is illustrated as being cupric sulphate and mercurous sulphate. When one portion or container is heated, the chemical reactions occur as set forth in connection with FIGS. 7 and 9 and an electrical potential is obtained. This results in the depositing of amounts of copper on the case in the heated cell and of the production of mercury in the insulated or non-heated portion of the cell.

Figure 10:
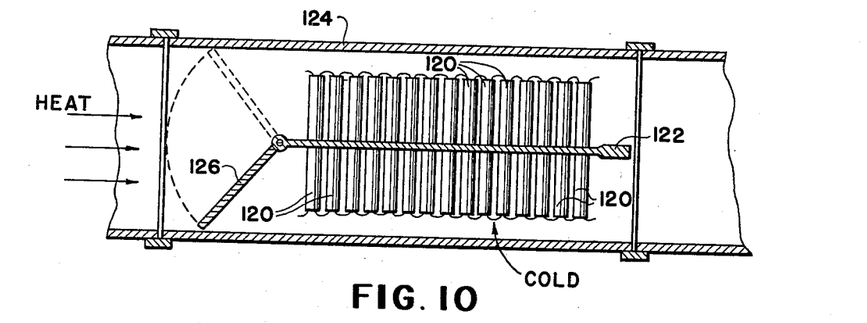
FIG. 10 is a view, partially in cross section, illustrating a plurality of the cells of the invention assembled to receive heat.
Figure 11:
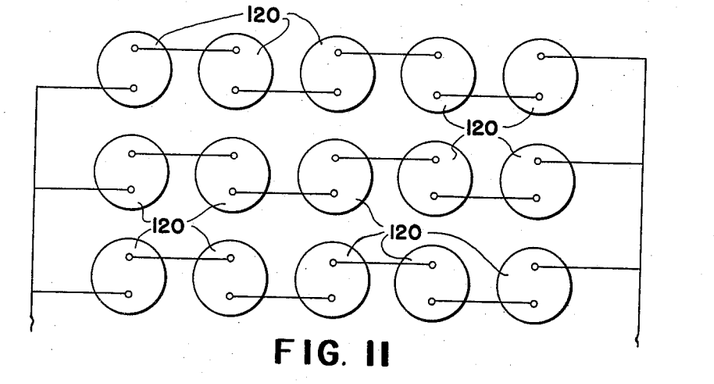
FIG. 11 is a view illustrating a preferred manner of assembling a plurality of cells as indicated in FIG. 10 to obtain desired voltage and amperage.

FIGS. 10 and 11 of the drawings illustrate an application of the electrochemical cells of the invention whereby heat energy normally lost is utilized in the production of electrical energy. A plurality of cells are shown at 120 and are mounted in a wall or the like 122, the wall 122 preferably being constructed of an insulating material. Wall 122 and cells 120 therein are positioned in an exhaust pipe, duct, flue or the like 124 which receive heat as indicated by the arrows at the left side of FIG. 10. Or, if desired duct 124 can be a conduit for a cooling fluid to cool a portion of cells 120, for example cooling water or air, exhaust from industrial processes, and the like. Wall 122 preferably has a movable end, damper or directing baffle 126 which can be pivotally or hingedly mounted on the main portion of the wall 122. By moving the hinged baffle 126 from the position shown in the solid lines to the dotted lines and reverse thereof, heating or cooling fluid from the flue, exhaust, duct, or the like, is directed to one portion or side of the cells 120 and is then directed to the other side or portion of the cells. The heating or cooling fluid is directed toward one side until substantially all of the crystalline chemical compound therein has gone into solution, and then by moving the member 126 the cell reactions are reversed and the cell can be used again. Such an arrangement permits very extensive utilization of energy normally lost. The cells 120 can be any of the types illustrated in the previously discussed embodiments of the invention or modification thereof as will be apparent to those skilled in the art. When a plurality of cells 120 are utilized as illustrated, they are preferably wired in the manner shown in FIG. 11 to obtain great voltage and amperage relative the amount obtained from an individual cell. The means of connecting the individual cells to obtain a desired result will be apparent to one skilled in the art.

For high efficiency a relatively large temperature differential is desirably provided between the sides of the cells. In many instances, it is possible to maintain the cold side of the cell at a temperature just above the freezing temperature of the solution and maintain the hot side of the cell at a temperature just below the boiling point or point of vaporization of the solution. The temperature differential can be further increased by maintaining the hot side of the cell under pressure and/or by supercooling the cold side of the cell to prevent vaporization and freezing of the solution. Furthermore, in some instances both sides or portions of the cell can be heated to different temperatures, such as in arctic regions where it will be desirable to maintain some heating in even the cold side of the cell to prevent freezing thereof.

The various constructions of the cells described hereinbefore can be used in many environments and installations. For example, radiant heat energy from the sun can be utilized to obtain the temperature differential between the portions of the cell for use in space vehicles, remote installations, etc. where other sources of energy are not readily available. The cell shown and described in connection with FIGS. 3-6 is particularly suitable for such applications. Also, the various cells can be used to recover or convert heat energy available from such as exhausts from internal combustion engines, industrial processes, reactors, heat transfer devices, turbines, jet engines, lighting apparatus, heating elements, etc. Cooling of one portion of the cell by removing heat therefrom, singly or while heating the other portion of the cell, will often be desirable, particularly in arctic regions, sea going vessels, etc. where the surrounding atmosphere, water, and the like is normally cooler than the interior of buildings, vessels and the like. The output of the cell can be utilized to run any suitable electrical equipment, charge common storage batteries, provide lighting, operate radio equipment, etc.

While the invention has been described in connection with preferred specific embodiments thereof, it will be apparent to those skilled in the art that various modifications of this invention can be made or followed, in the light of this description and discussion, without departing from the spirit of the disclosure or the scope of the claims.

We claim:

1. A cell for the conversion of heat energy comprising, in combination, means forming two chambers, saturated solutions of an ionized compound disposed in each of said chambers, an excess of said compound in solid form being disposed in one of said chambers, an electrically nonconducting ion bridge of sintered glass disposed in ion exchange communication with said two chambers, means for conducting heat to said one of said chambers, means for insulating the other of said chambers from heat, an electrode disposed in each of said containers in contact with said solution therein, each said electrode being of a material reversible to an anion of said ionized compound in solution, and said compound in solid form ionizing upon being heated and causing cations to pass through said ion bridge from said one of said chambers to said other of said chambers and creating an electrical potential differential between said electrodes.

2. An electrochemical cell for conversion of heat energy to electrical energy comprising, in combination, an heat insulated elongated tubular member, a wall extending across and connected to said tubular member dividing the same into two chambers, said dividing wall having an aperture formed therein and extending therethrough, an ion bridge mounted in said aperture in said dividing wall, copper electrode means lining said chambers, two conductors, one of said conductors being secured to each of said copper electrode means and extending through said tubular member, cover members removably mounted in the ends of said tubular member, said cover members permitting passage of radiant heat therethrough, a plurality of elongated dark colored metallic baffles positioned in each of said chambers and extending thereacross in staggered relation to absorb radiant heat admitted through the ends of said tubular member, saturated solutions of cupric sulphate in water contained in each of said chambers, an excess of cupric sulphate in solid form contained in one of said chambers so that when the end of said one chamber is exposed to radiant heat and said solution is heated, while insulating the other of said chambers from heat by said tubular member and said dividing wall, some of said cupric sulphate in the solid form will enter into solution and ionize and sulphate ions will pass through said ion bridge to said other of said chambers, resulting in an electrical potential differential between said electrodes.

3. An electrochemical cell for the conversion of heat energy to electrical energy comprising, in combination, an heat insulated elongated tubular member, a wall extending across said tubular member dividing the same into two chambers, said dividing wall having an aperture formed therein and extending therethrough, silver electrode means lining the walls of said chambers, two conductors, one of said conductors being secured to each of said silver electrode means and extending through said tubular member, an ion bridge mounted in said aperture, cover members removably enclosing the ends of said tubular member, said cover members being constructed to admit heat therethrough, saturated solutions of calcium chloride in water disposed in each of said chambers, an excess of calcium chloride in the solid form being disposed in one of said chambers so that when said one of said chambers receives heat through one of said cover members and the other of said chambers is insulated from heat by said tubular member and said dividing wall, said calcium chloride in the solid form in said one of said chambers enters into solution and ionizes and calcium ions pass through said ion bridge to said other of said chambers, resulting in an electrical potential differential between said electrodes.

4. A cell for the conversion of heat energy to electrical energy comprising, in combination, means forming two chambers, a saturated solution of copper sulphate in water disposed in each of said chambers, an excess of copper sulphate in solid form disposed in one of said chambers, two copper electrodes, one of said copper electrodes in each of said chambers in contact with said solution therein, a layer of mercury positioned on the bottom of each of said chambers, a layer of mercurous sulphate positioned on each said layer of mercury, an electrical conductor extending into each of said chamber and terminating each said layer of mercury, means for conducting heat to said solution in one of said chambers and insulating the other of said chambers from heat in such a manner that when said solution in said one of said chambers is heated said copper sulphate in solid form enters into solution and ionizes and sulphate ions combine with said mercury to form additional amounts of mercurous sulphate, and copper ions in said other of said chambers combine with sulphate ions from said mercurous sulphate to form additional copper sulphate therein, resulting in an electrical potential differential between said electrodes in said chambers.

5. A cell for the conversion of heat energy to electrical energy comprising, in combination, two copper containers, an ionizable compound of copper sulphate and mercurous sulphate in paste form disposed in each of said copper containers, an excess of mercurous sulphate in solid form disposed in one of said copper containers, an electrode of mercury in porous carbon and an electrode of copper positioned in contact with said compound in each of said copper containers, an electrical conductor connected to said copper electrodes, said mercurous sulphate of said compound in said one of said copper containers ionizing on being heated to a temperature higher than the temperature of said compound in the other of said copper containers to deposit mercury ions on said electrode of mercury in porous carbon therein with sulphate ions combining with copper from said one of said copper containers forming additional copper sulphate, and said copper sulphate in the other of said copper containers ionizing with copper ions being deposited on said other of said copper containers and with sulphate ions combining with mercury of said electrode of mercury of porous carbon therein to produce additional mercurous sulphate and resulting in an electrical potential differential between said copper electrodes in said containers.

6. The method of obtaining electrical energy from heat energy comprising the steps of, filling two chambers with saturated solutions of copper sulphate in water, placing an excess of copper sulphate in the solid form in one of said chambers, placing an electrically nonconducting ion bridge in communication with said chambers for permitting ion exchange therebetween, extending a copper electrode into each of said chambers in contact with said solution therein, and heating said solution in said one of said chambers while insulating said solution in the other of said chambers from heat to create a temperature differential between said solutions in said chambers to cause the passing into solution of at least a part of said copper sulphate in the solid form and the transfer of ions through said bridge from said one of said chambers to said other of said chambers to establish a concentration differential between said solutions and an electrical potential differential between said electrodes in said chambers.

7. The method of obtaining electrical energy from heat energy comprising the steps of, filling two chambers with saturated solutions of calcium chloride, placing an excess of calcium chloride in one of said chambers, said two chambers having electrodes therein reversible to an ion of said solutions in contact with said solutions, placing an ion bridge in communication with said solutions in said chambers for permitting ion exchange therebetween, and heating said solution in said one of said chambers while insulating said solution in the other of said chambers from heat to create a temperature differential between said solutions to cause the passing into solution of at least part of said calcium chloride in the solid form and the transferring of cations through said bridge from said one of said chambers to said other of said chambers to establish a concentration differential between said solutions and an electrical potential differential between said chambers.

8. A method of obtaining electrical energy from heat energy comprising the steps of, filling two chambers containing copper electrodes with saturated solutions of copper sulphate in water, placing a layer of mercury in the bottom of each of said chambers, placing a layer of mercurous sulphate on said layer of mercury in each of said chambers, placing an electrical conductor in connection with said layers of mercury in said chambers, placing an excess of copper sulphate in solid form in one of said chambers, and heating said solution in said one of said chambers while insulating said solution in the other of said chambers from heat to create a temperature differential between said solutions to cause the passing into solution of at least part of said copper sulphate in the solid form with sulphate ions combining with a portion of said mercury to form additional amounts of mercurous sulphate in said one of said chambers, and with a portion of said mercurous sulphate in the other of said chambers ionizing and establishing a concentration differential between said solutions and an electrical potential differential between said copper electrodes in said chambers.

9. A method of obtaining electrical energy from heat energy comprising the steps of, filling two chambers with saturated solutions of an ionizable material containing sulphate ions, placing electrodes in said solutions in each of said chambers reversible to an ion of said ionizable material, placing a layer of mercury in each of said chambers, placing a layer of mercurous sulphate in each of said chambers, placing an electrical conductor in electrical connection with each said layer of mercury, and heating said solution in said one of said chambers while insulating said solution in the other of said chambers from heat to create a temperature differential between said solutions and causing the passing into solution of at least a portion of said solid ionizable material and the depositing of additional amounts of mercurous sulphate in said one of said chambers and a corresponding reduction in the amount of mercurous sulphate in the other of said chambers to establish a concentration differential between said solutions and an electrical potential differential between said electrodes in said chambers.

10. A method of obtaining electrical energy from heat energy comprising the steps of, filling two chambers with saturated solutions of an ionizable compound, placing an excess of said compound in solid form in one of said chambers, providing two electrodes in each of said chambers in contact with said solutions, one of said electrodes in each of said chambers being reversible to a cation of said compound, the other of said electrodes in each of said chambers being reversible to an anion of said compound, connecting an electrical conductor to said electrodes reversible to one of said ions to connect said chambers in ion exchange relationship, and heating said solution in said one of said chambers while insulating said solution in the other of said chambers from heat to cause the passing into solution of at least part of said compound in the solid form and provide a concentration differential between said solutions and an electrical potential differential between the other of said electrodes in said chambers.

11. The method of obtaining electrical energy from heat energy comprising the steps of, filling two copper containers with a paste material of copper sulphate and mercurous sulphate, connecting an electrical conductor to each of said copper containers, providing an electrode of mercury in porous carbon in each of said copper containers, and heating one of said copper containers while insulating the other of said copper containers from heat to cause ionization of said paste material in said one of said copper containers with mercury ions being deposited on said electrode of mercury in porous carbon in said one of said copper containers and with sulphate ions combining with copper ions from said copper of said one of said copper containers to provide additional amounts of copper sulphate, and with copper ions from said paste material in the other of said copper containers being deposited on said other of said copper containers and with sulphate ions from said paste material combining with mercury ions from said electrode of mercury in porous carbon in said other of said copper containers for providing a concentration differential between said paste material in said copper containers and a resulting electrical potential differential between said electrodes of mercury in porous carbon.

References Cited by the Examiner

UNITED STATES PATENTS

| | | | |
|---|---|---|---|
| 615,539 | 12/1898 | Emanuel | 136—83 |
| 2,310,354 | 2/1934 | Deysher | 136—83 |
| 2,977,050 | 3/1961 | Sparrow | 236—1 |
| 3,031,520 | 4/1962 | Clampitt et al. | 136—89 |
| 3,057,945 | 10/1962 | Rinnovatore et al. | 136—83 |

OTHER REFERENCES

Electrical World, vol. 8, No. 23, p. 275.

English et al.: Principles of Organic Chemistry, 1949, p. 352, Cis-Trans Interconversion paragraph.

Heidt: Proceedings American Academy Arts & Sciencies, vol. 79, 1951, pp. 228–233.

Webster: New International Dictionary, 2nd Edition, 1960, p. 2220.

ALLEN B. CURTIS, *Primary Examiner.*

JOHN R. SPECK, MURRAY TILLMAN, WINSTON A. DOUGLAS, *Examiners.*

H. FEELEY, B. J. OHLENDORF, *Assistant Examiners.*